(12) United States Patent
Wada et al.

(10) Patent No.: US 9,401,814 B2
(45) Date of Patent: Jul. 26, 2016

(54) HOUSE MONITORING SYSTEM

(71) Applicant: Panasonic Intellectual Property Management Co., Ltd., Osaka (JP)

(72) Inventors: Nobuyuki Wada, Fukuoka (JP); Hiroshi Tsuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/671,836

(22) Filed: Mar. 27, 2015

(65) Prior Publication Data

US 2016/0149717 A1  May 26, 2016

(30) Foreign Application Priority Data

Nov. 21, 2014 (JP) .................................. 2014-237044

(51) Int. Cl.
*H04B 1/38* (2015.01)
*H04L 12/28* (2006.01)

(52) U.S. Cl.
CPC .......... *H04L 12/282* (2013.01); *H04L 12/2827* (2013.01)

(58) Field of Classification Search
CPC ......... H04N 5/44; H04N 71/185; H04Q 9/00; G08C 17/02; G06Q 30/0282; G08B 21/02
USPC ................. 455/572, 343.1; 340/12.25, 12.28, 340/870.07, 538, 573.1, 539.1, 870.01, 340/870.02, 870.03; 705/26.7, 347
See application file for complete search history.

(56) References Cited

U.S. PATENT DOCUMENTS

| 7,181,191 | B2 | 2/2007 | Takeda et al. |
| 8,536,998 | B1 * | 9/2013 | Siu ...................... H04L 12/2829 340/538 |
| 2005/0227742 | A1 * | 10/2005 | Takeda ................ H04M 11/007 455/572 |

(Continued)

FOREIGN PATENT DOCUMENTS

| DE | 102011054624 A1 | 4/2013 |
| JP | 2004-022355 A | 1/2004 |

(Continued)

OTHER PUBLICATIONS

International Search Report and Written Opinion mailed Jul. 30, 2015, for corresponding International Application No. PCT/JP2015/001267, 11 pages.

(Continued)

*Primary Examiner* — Allahyar Kasraian
*Assistant Examiner* — Farid Seyedvosoghi
(74) *Attorney, Agent, or Firm* — Seed IP Law Group PLLC

(57) ABSTRACT

In a monitoring system, a master device that is connected to a fixed telephone network so as to perform calls to other fixed telephones sets a power supply device to an operation mode in a case where a mobile phone terminal is located within a wireless communication range of the master device, and sets the power supply device to an operation stop mode in a case where the mobile phone terminal is not located within the wireless communication range of the master device. A power supply device is connected to an electric apparatus disposed in a house, supplies power to the electric apparatus in a case where the operation mode is set by the master device, and does not supply power to the electric apparatus in a case where the operation stop mode is set by the master device.

10 Claims, 9 Drawing Sheets

(56) References Cited

U.S. PATENT DOCUMENTS

| | | |
|---|---|---|
| 2013/0332306 A1 | 12/2013 | Fahmy et al. |
| 2014/0068486 A1* | 3/2014 | Sellers ............... G06F 3/04847 715/771 |
| 2014/0070959 A1 | 3/2014 | Bhargava et al. |
| 2014/0340203 A1 | 11/2014 | Chen et al. |

FOREIGN PATENT DOCUMENTS

| | | |
|---|---|---|
| JP | 2004-208021 A | 7/2004 |
| JP | 2007-323533 A | 12/2007 |
| JP | 2010-250680 A | 11/2010 |
| JP | 2012-196016 A | 10/2012 |
| WO | 2008/090401 A1 | 7/2008 |

OTHER PUBLICATIONS

JoeHMS: "Anwesenheitsteurung mit Fritzbox and Smartphone", May 5, 2012, XP002742280, Retrieved from the Internet: URL:http://homematic-forum.de/forum/viewtopic.php?f=18&t=9001 [retrieved on Jul. 14, 2015],12 pages.

FHEMWiki: "FRITZ!DECT200: Unterschied zwischen den Versionen", Apr. 27, 2014, XP002742279, Retrieved from the Internet: URL:http://www.fhemwiki.de/w/index.php?title=FRITZ!DECT_200&diff=8767&oldid=6116 [retrieved on Jul. 15, 2015], 7 pages.

\* cited by examiner

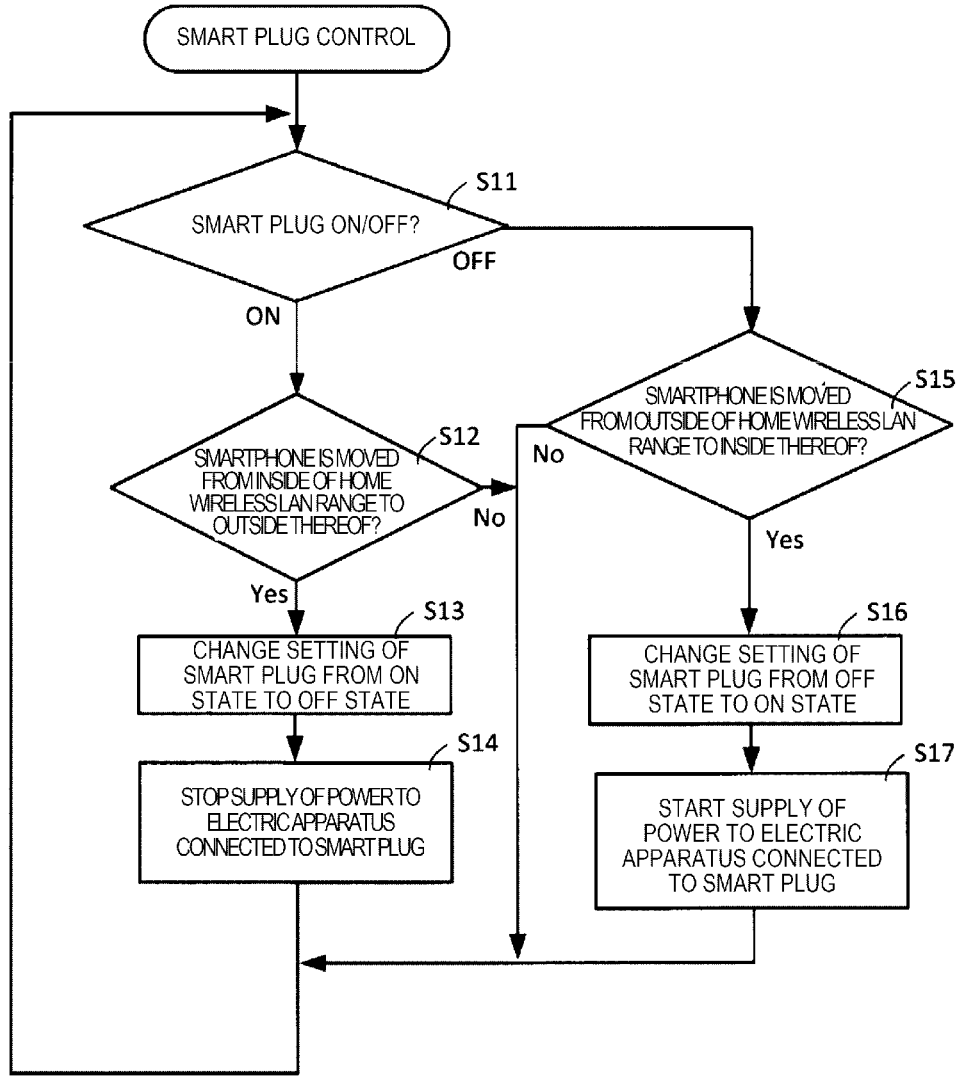

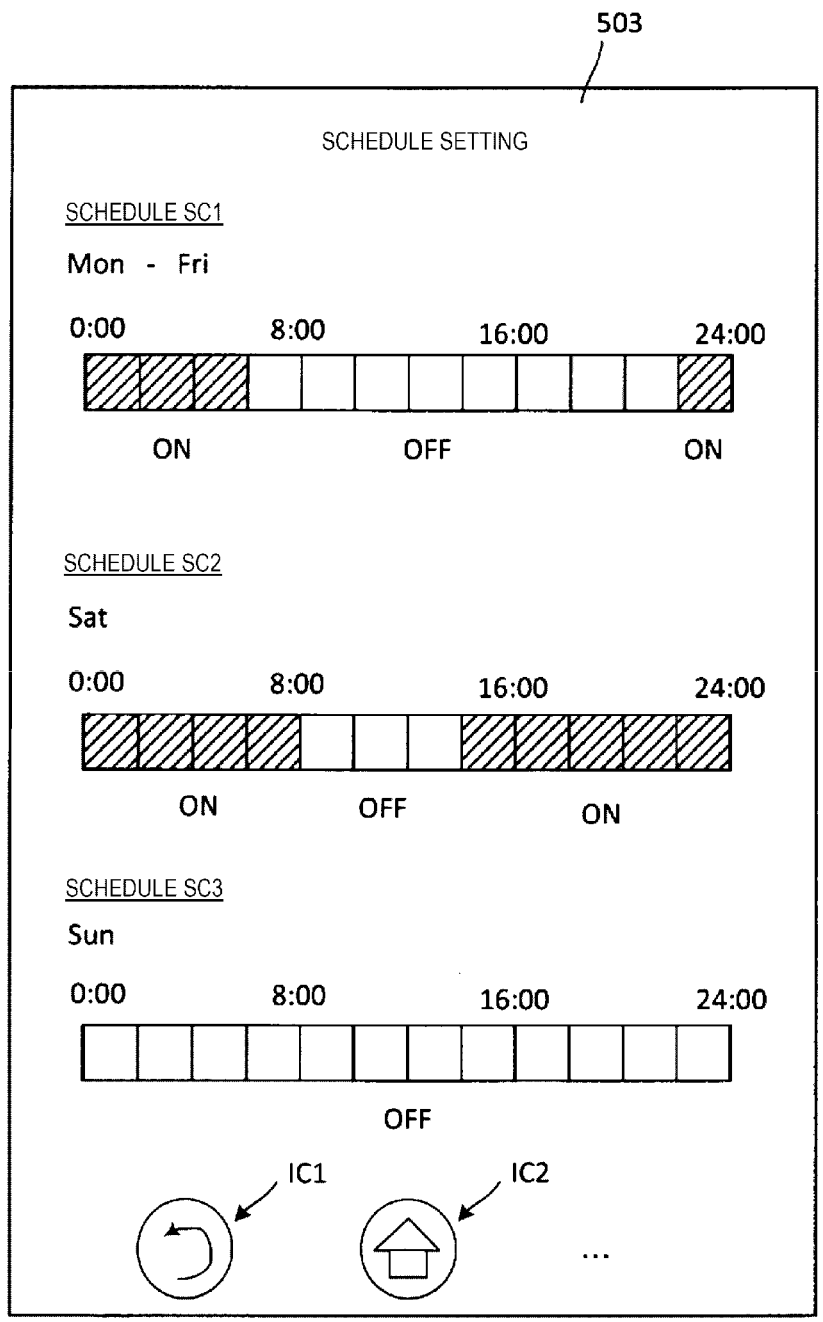

HOUSE MONITORING SYSTEM

BACKGROUND OF THE INVENTION

1. Field of the Invention

The present invention relates to a house monitoring system which monitors circumstances in a house.

2. Description of the Related Art

In the related art, as an example of a monitoring system for monitoring the inside of a house, there is a monitoring camera system which easily performs remote monitoring even from a remote location and monitors a monitoring target by using bidirectional communication of video and sound (for example, refer to Japanese Patent Unexamined Publication No. 2007-323533).

The monitoring system disclosed in Japanese Patent Unexamined Publication No. 2007-323533 includes a controller which is a monitoring server installed at an indoor distribution board in a predetermined house lot (within a house), a first camera unit which is an interphone slave device installed at an entrance door, a second camera unit which is installed in a dining room, a third camera unit which is installed in a bedroom, an indoor unit which is an interphone master device installed in a living room, and one or more mobile phones present at remote places. For example, in a case where a dweller is out, when each camera unit detects an intruder, the controller switches and transmits a captured video signal and a collected audio signal to the mobile phone so as to capture the intruder.

SUMMARY OF THE INVENTION

However, in the above-described configuration disclosed in Japanese Patent Unexamined Publication No. 2007-323533, since a video signal and an audio signal from each camera unit are appropriately switched and transmitted to the mobile phone so as to capture motion and sound of the intruder, a configuration of the controller is complex, and this inevitably leads to an increase in cost, and it is difficult to implement a monitoring system including the controller at low cost. In the above-described configuration disclosed in Japanese Patent Unexamined Publication No. 2007-323533, control of ON and OFF of electric apparatuses disposed in a house even without performing a special operation on a mobile phone is not taken into consideration, and thus there is also a problem in that a user's convenience is not sufficient.

In order to solve the problems, the present invention provides a house monitoring system which switches ON and OFF an electric apparatus of a house simply and at low cost depending on whether or not a mobile phone terminal is located within a communication range of an existing fixed telephone which is connected to a fixed telephone network and can perform calls to other fixed telephones, and thus improves the user's convenience.

According to the present invention, there is provided a house monitoring system including a master device that is connected to a fixed telephone network so as to perform calls to other fixed telephones; a mobile phone terminal that performs wireless communication with the master device by using a wireless router, and is connected to other mobile phones via a mobile phone network; and a power supply device that is connected to an electric apparatus disposed in a house, and supplies power to the electric apparatus, in which the master device sets the power supply device to an operation mode in a case where the mobile phone terminal is located within a wireless communication range of the master device, and sets the power supply device to an operation stop mode in a case where the mobile phone terminal is not located within the wireless communication range of the master device, and in which the power supply device supplies power to the electric apparatus in a case where the operation mode is set by the master device, and does not supply power to the electric apparatus in a case where the operation stop mode is set by the master device.

According to the present invention, it is possible to switch ON and OFF an electric apparatus of a house simply and at low cost depending on whether or not a mobile phone terminal is located within a communication range of an existing fixed telephone which is connected to a fixed telephone network and can perform calls to other fixed telephones, and thus to improve a user's convenience.

BRIEF DESCRIPTION OF DRAWINGS

FIG. 8 is a flowchart illustrating an example of an operation procedure of controlling ON and OFF of the smart plug in the house monitoring system of the present embodiment; and FIG. 9 is a diagram illustrating an example of a state in which an ON/OFF schedule setting screen of the smart plug is displayed on the smartphone in the house monitoring system of the present embodiment.

DETAILED DESCRIPTION OF THE PREFERRED EMBODIMENT

With reference to the drawings, a description will be made of an embodiment (hereinafter, referred to as "the present embodiment") of a house monitoring system related to the present invention. In the following present embodiment, as an example of a house monitoring system related to the present invention, an exemplary house monitoring system used for home security or used for improving life or convenience of home monitoring of a home dweller (hereinafter, simply referred to as a "user") will be described. The present invention is not limited to a house monitoring system, and may be represented as each of devices constituting the house monitoring system, a method for each device, and a program.

A house monitoring system of the present embodiment includes a master device that is connected to a fixed telephone network so as to perform calls to other fixed telephones; a mobile phone terminal that performs wireless communication with the master device by using a wireless router, and is connected to other mobile phones via a mobile phone network; and a power supply device that is connected to an electric apparatus disposed in a house, and supplies power to the electric apparatus, in which the master device sets the power supply device to an operation mode in a case where the mobile phone terminal is located within a wireless communication range of the master device, and sets the power supply device to an operation stop mode in a case where the mobile phone terminal is not located within the wireless communication range of the master device, and in which the power supply device supplies power to the electric apparatus in a case where the operation mode is set by the master device, and does not supply power to the electric apparatus in a case where the operation stop mode is set by the master device.

Figure 1:
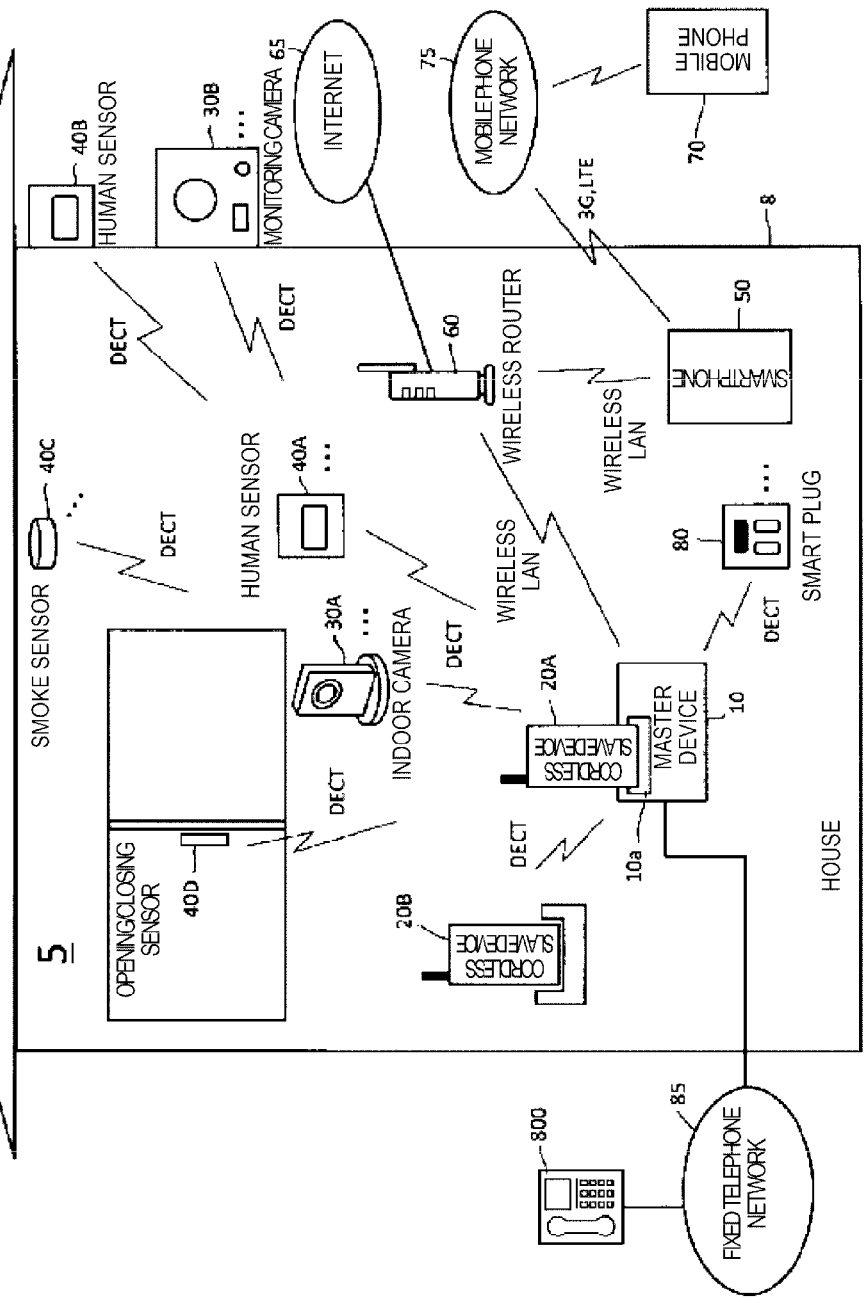
FIG. 1 is a diagram illustrating an example of a system configuration of a house monitoring system of the present embodiment.

FIG. 1 is a diagram illustrating a system configuration of house monitoring system 5 of the present embodiment. House monitoring system 5 is mainly provided in house 8, and includes master device 10, two cordless slave devices 20A and 20B (hereinafter, simply referred to as "slave devices"), a plurality of cameras (specifically, indoor camera 30A, monitoring camera 30B, . . . ), various sensors (specifically, human sensors 40A and 40B, smoke sensor 40C, opening/closing sensor 40D, . . . ), smartphone 50, wireless router 60, and a plurality of smart plugs (smart plug 80, . . . ). Although not illustrated in FIG. 1, each smart plug 80 is electrically connected to an electric apparatus (for example, an air conditioner or lighting equipment) which is disposed in the house. A configuration of house monitoring system 5 is only an example and may be modified in various aspects.

Master device 10 which functions as a gateway in house monitoring system 5 is a control device which controls the entire operation of house monitoring system 5, and is connected to the slave devices, the cameras, the sensors, the smart plugs, and the like in a communicable manner by using a communication method such as digital enhanced cordless telecommunications (DECT). Master device 10 is connected to the Internet 65 via wireless router 60 using a wireless LAN. Master device 10 is connected to fixed telephone network 85 in a wired manner and can perform a call to fixed telephone 800. Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, opening/closing sensor 40D, . . . ) are connected to master device 10 in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

A plurality of cameras (specifically, indoor camera 30A, monitoring camera 30B, . . . ) have a call function and are connected to master device 10 in the DECT wireless communication method. Herein, as cameras, monitoring camera 30B which captures an image of an outdoor environment, and indoor camera 30A which captures an image of house 8, are used. Particularly, in a case where the cameras are not required to be differentiated from each other, the cameras are collectively referred to as camera 30.

Smartphone 50 is connected to master device 10 via wireless router 60 using a wireless LAN, and is connected to mobile phone 70 or other smartphones via mobile phone network 75 using a communication method such as the third generation (3G) method, a high speed packet access (HSPA) method, or a long term evolution (LTE) method.

Smart plugs 80 have a wireless communication function using DECT, and are connected to master device 10 by using a wireless communication method such as DECT. Smart plugs 80 are electrically connected to electric apparatuses (for example, an air conditioner, lighting equipment, camera 30, and sensor 40) disposed in house 8, and supply power to the electric apparatus which is connected to each smart plug 80 during an operation mode and do not supply power to the electric apparatus which is connected to each smart plug 80 during an operation stop mode.

Figure 2:
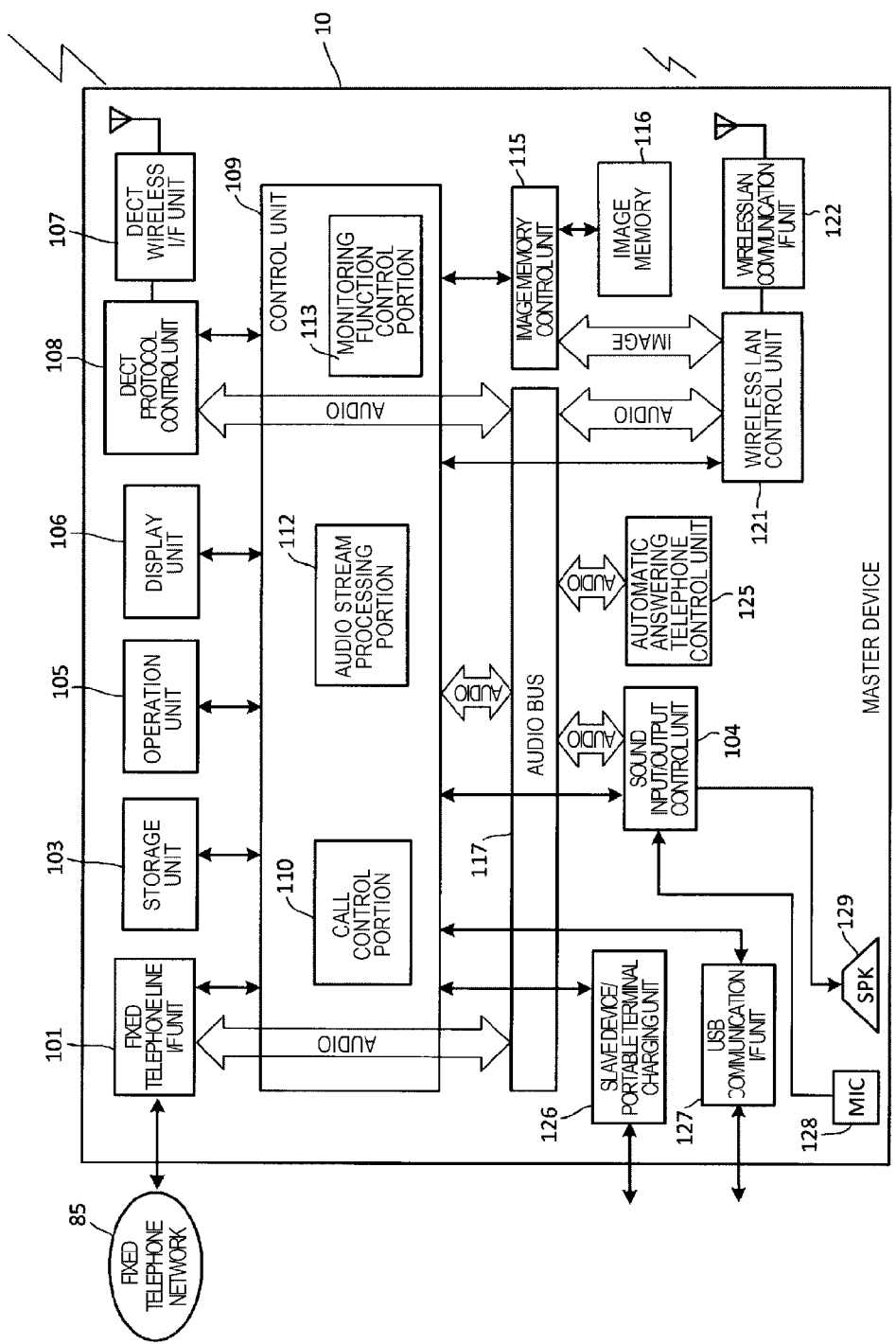
FIG. 2 is a block diagram illustrating an example of an internal configuration of a master device.

FIG. 2 is a block diagram an example of illustrating an internal configuration of master device 10. Master device 10 includes control unit 109, storage unit 103, operation unit 105, and display unit 106. Master device 10 receives various input operations and displays information such as an image on display unit 106. Control unit 109 has call control portion 110 and audio stream processing portion 112 built thereinto, and performs call control during calling, processing of audio data, and the like.

Master device 10 includes image memory control unit 115 and image memory 116, and stores image data or the like captured by camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 800 (refer to FIG. 1) connected to fixed telephone network 85.

Master device 10 includes slave device/portable terminal charging unit 126 and charges slave device 20 or smartphone 50 inserted into insertion port 10a.

Master device 10 includes automatic answering telephone control unit 125, for example, which receives audio signal through microphone 128, performs a predetermined audio signal process on the received audio signal so that an automatic answering telephone message is stored, and controls recording and reproduction of the automatic answering telephone message.

Master device 10 includes USB communication I/F unit 127, and transmits and receives data to and from an apparatus, a memory, or the like having an interface of a universal serial bus (USB) standard.

Master device 10 registers pairs of various sensors 40 and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus respectively registered in correlation with a plurality of indoor cameras 30A disposed in the house.

Figure 3:
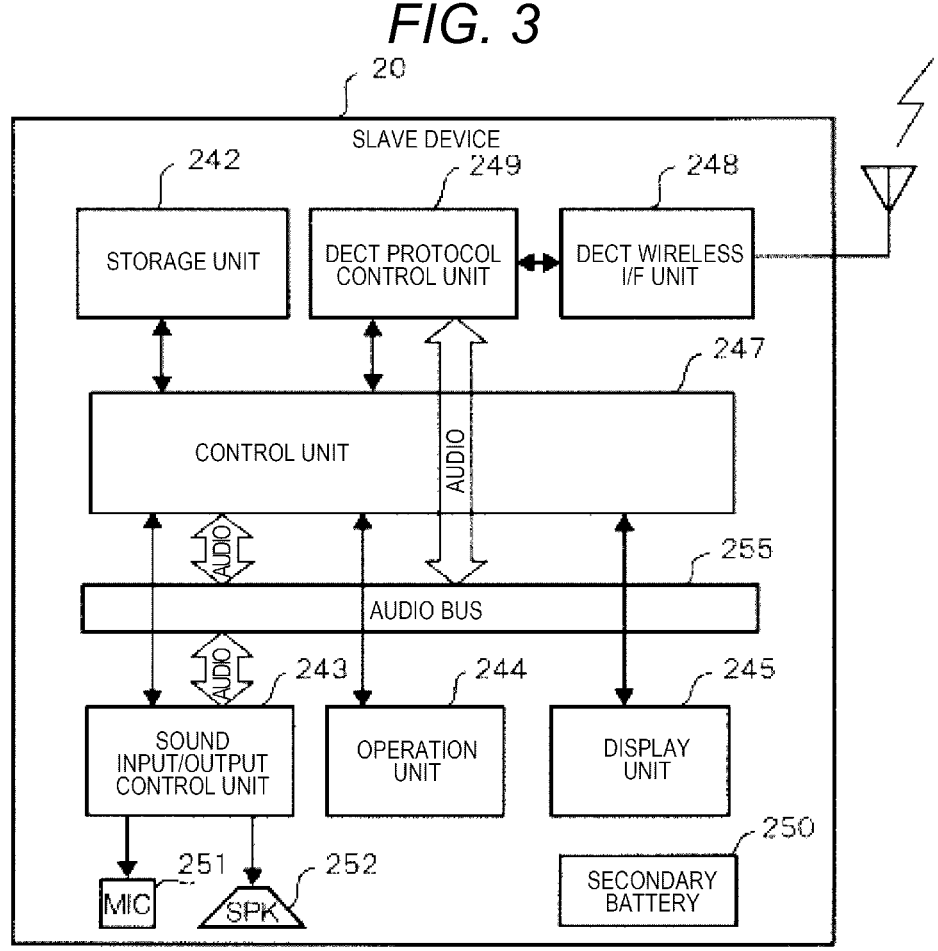
FIG. 3 is a block diagram illustrating an example of an internal configuration of a cordless slave device.

FIG. 3 is a block diagram illustrating an example of an internal configuration of (cordless) slave device 20. Slave device 20 includes control unit 247, storage unit 242, operation unit 244, and display unit 245. Slave device 20 receives various input operations and displays information such as an image on display unit 245.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device.

Slave device 20 includes secondary battery 250 which is rechargeable, and, in a case of being used as a cordless slave device, each unit of slave device 20 is supplied with power from secondary battery 250 so as to perform an operation.

Figure 4:
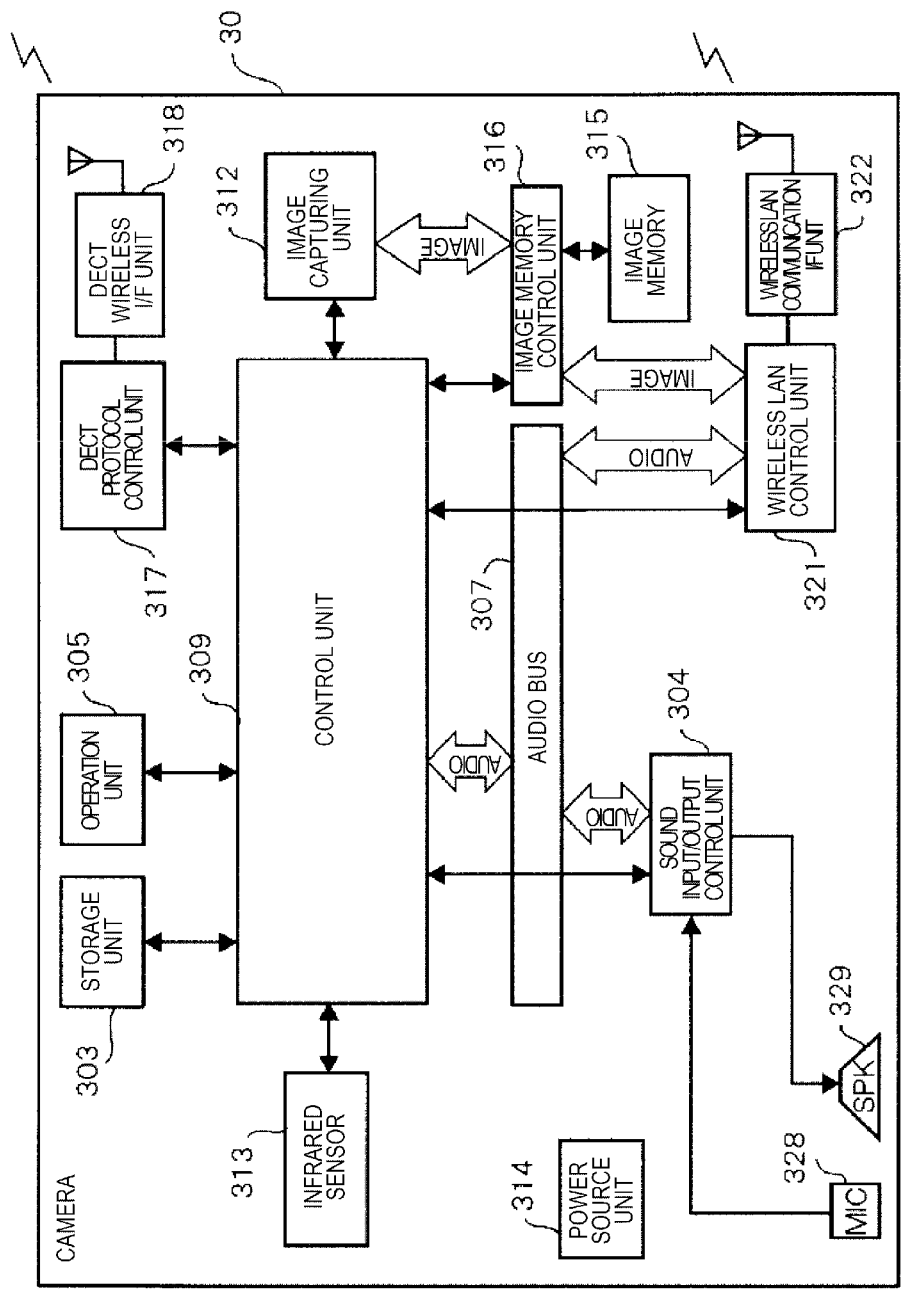
FIG. 4 is a block diagram illustrating an example of an internal configuration of a camera.

FIG. 4 is a block diagram illustrating an example of an internal configuration of camera 30. Indoor camera 30A and monitoring camera 30B as examples of cameras 30 have substantially the same configuration as each other. Camera 30 includes control unit 309, storage unit 303, and operation unit 305. Camera 30 performs an operation related to image capturing and also receives input operations. In the present embodiment, camera 30 may include, for example, a baby monitoring camera (not illustrated) disposed in order to monitor a baby bed of house 8 or the vicinity thereof, in addition to indoor camera 30A or monitoring camera 30B.

Camera 30 includes DECT protocol control unit 317 and DECT wireless I/F unit 318, and performs wireless connection to master device 10 by using a wireless method such as DECT.

Camera 30 includes wireless LAN control unit 321 and wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device. For example, camera 30 transmits audio data collected by microphone 328 to master device 10, and outputs audio data including selected audio data (which will be described later) transmitted from master device 10, from speaker 329.

Camera 30 includes image capturing unit 312, image memory control unit 316, and image memory 315, and stores image data captured by image capturing unit 312 in image memory 315. Image capturing unit 312 has a known image capturing mechanism and includes at least a lens and an imaging element (for example, an image sensor such as a charge coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared ray) generated by the person. Camera 30 includes a power source unit 314 which is constituted by a commercial AC power source. However, in a case where camera 30 is the above-described baby monitoring camera, infrared sensor 313 is not provided in the baby monitoring camera.

Figure 5:
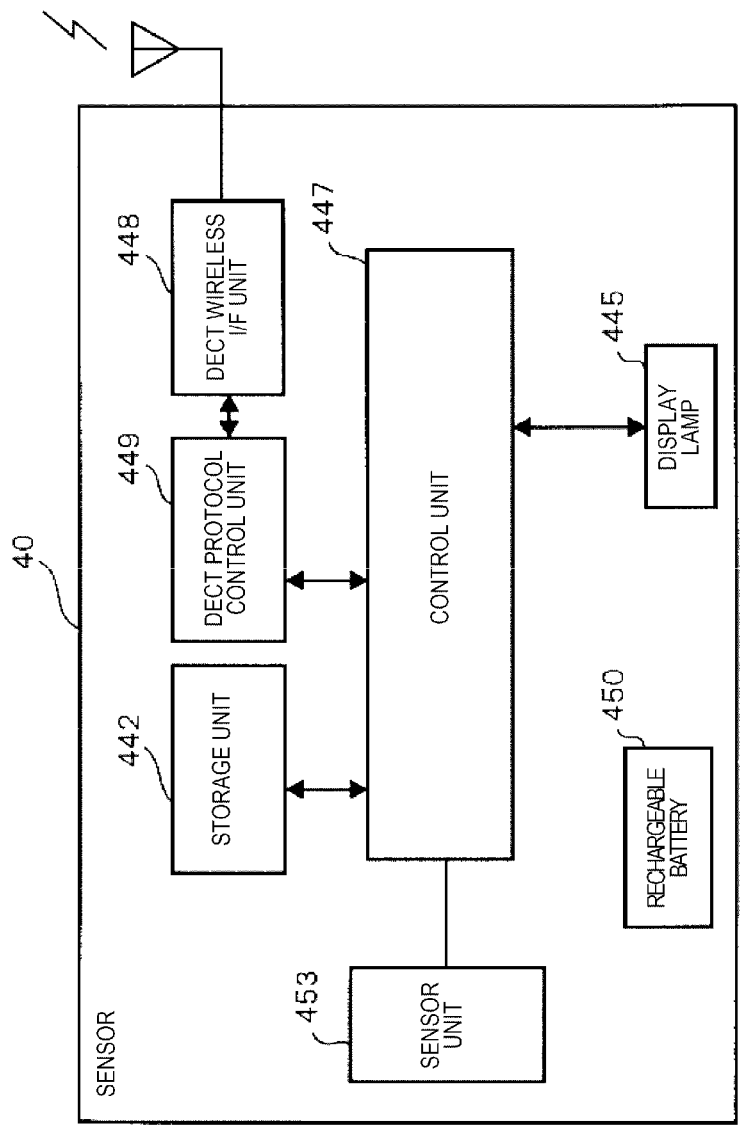
FIG. 5 is a block diagram illustrating an example of an internal configuration of a sensor.

FIG. 5 is a block diagram illustrating an example of an internal configuration of sensor 40. Sensor 40 includes control unit 447, storage unit 442, and display lamp 445. Sensor 40 performs a predetermined detection operation, such as turning on display lamp 445, in a case where a target (for example, an intruder which is also the same for the following description) is detected.

Sensor 40 includes DECT protocol control unit 449 and DECT wireless I/F unit 448, and performs wireless connection to master device 10 by using a wireless method such as DECT, and sends sensor detection information to master device 10 when a target is detected.

Sensor unit 453 differs depending on the kind of sensor 40. For example, in a case of human sensors 40A and 40B, sensor unit 453 is a PIR sensor which detects a person through a change in infrared rays. In a case of opening/closing sensor 40D which detects opening and closing of a front door, a window, or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke. Secondary battery 450 is a rechargeable battery and supplies power to each unit. Sensor unit 453 may be a temperature sensor which can detect an ambient temperature.

Figure 6:
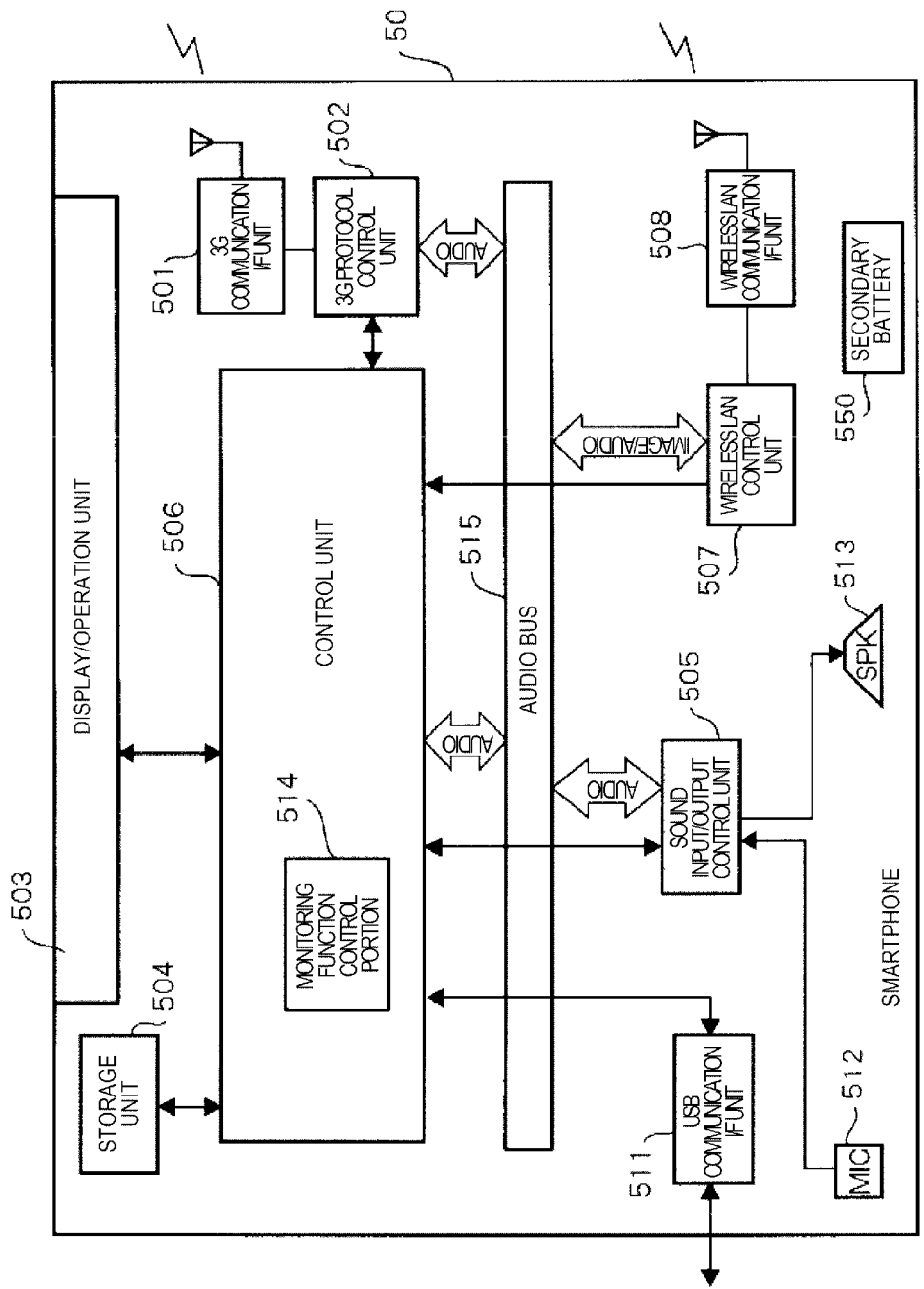
FIG. 6 is a block diagram illustrating an example of an internal configuration of a smartphone.

FIG. 6 is a block diagram illustrating an example of an internal configuration of smartphone 50. Smartphone 50 as a mobile phone terminal includes control unit 506, storage unit 504, and display/operation unit (for example, touch panel) 503. Smartphone 50 receives various input operations and displays information such as an image or a schedule setting screen (refer to FIG. 9) which will be described later on display/operation unit 503. A monitoring function control portion 514 which can set a function of camera 30 is built into control unit 506 as will be described later. Display/operation unit 503, which is a display/input unit into which a display unit and an operation unit are integrated, displays information such as an image or an icon on a screen, and receives a tap operation (or a touch operation) on a screen performed by a user of smartphone 50.

Smartphone 50 includes 3G protocol control unit 502 and 3G wireless I/F unit 501, and performs wireless connection to mobile phone 70 or other smartphones connected to mobile phone network 75, by using a third generation (3G) wireless communication method. Smartphone 50 may include a protocol control unit and a wireless I/F unit corresponding to a wireless communication method (for example, HSPA or LTE) other than the 3G method.

Smartphone 50 includes audio bus 515, sound input/output control unit 505, speaker 513, and microphone 512, and performs input and output of sound to and from an external device. For example, smartphone 50 transmits audio data of a user collected by microphone 512 to master device 10, receives audio data of a call party collected by camera 30 from master device 10, and outputs the audio data transmitted from master device 10, from speaker 329.

Smartphone 50 includes wireless LAN control unit 507 and wireless LAN communication I/F unit 508, and transmits and receives image data and audio data to and from master device 10 or camera 30 via wireless router 60 connected over the wireless LAN.

Smartphone 50 includes USB communication I/F unit 511, and transmits and receives data to and from an apparatus, a memory, or the like having an interface of a universal serial bus (USB) standard.

Figure 7:
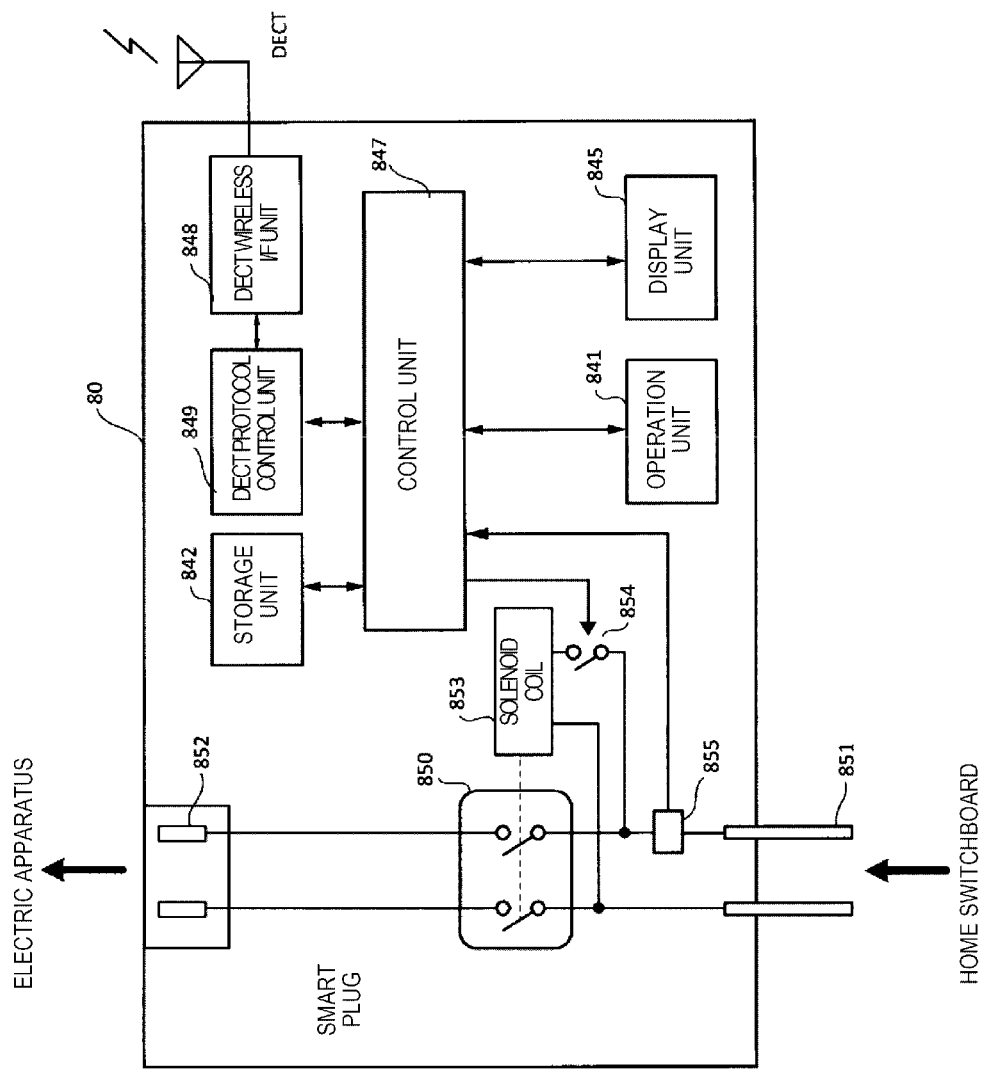
FIG. 7 is a block diagram illustrating an example of an internal configuration of a smart plug.

FIG. 7 is a block diagram illustrating an example of an internal configuration of the smart plug. Smart plug 80 includes control unit 847, storage unit 842, and display unit 845 having a display lamp. For example, schedule setting information regarding ON and OFF condition which can be set or changed by smart plug 80 performing communication with master device 10 through wireless communication using DECT are registered in storage unit 842.

Smart plug 80 includes DECT protocol control unit 849 and DECT wireless I/F unit 848, and performs wireless communication connection to master device 10 by using a wireless communication method such as DECT, and switches supply and cutoff of commercial AC power to each electric apparatus (for example, an air conditioner, lighting equipment, camera 30, or sensor 40) connected to individual smart plug 80 according to a signal (a switching signal, which will be described later, from master device 10) transmitted via the wireless communication connection.

Smart plug 80 includes switch unit 850. Switch unit 850 performs, for example, connection or disconnection of a power supply line as a power source between plug terminals 851 which are connected to socket terminals (not illustrated) exposed to various locations (for example, locations such as a dining room, a living room, and a bed room) of house 8 connected to a switchboard (not illustrated) of house 8, and socket terminals 852 which are connected to an electric apparatus. Switch unit 850 is driven for example by solenoid coil 853. Switch unit 850 is closed when a driving current flows through solenoid coil 853 from an AC power source, and thus plug terminals 851 are electrically connected to socket terminals 852. Switch unit 854 causes a driving current to or not to flow through solenoid coil 853 under the control of control unit 847.

Current detection element 855 is provided between plug terminals 851 and switch unit 850. When a current flows between plug terminals 851 and socket terminals 852, current detection element 855 detects the current and sends a detection signal to control unit 847. For example, if there is an input operation from operation unit 841, control unit 847 displays an amount (power supply amount) of power supplied to an electric apparatus on display unit 845 in a case where a detection signal is received from current detection element 855.

In a case where an operation mode instruction signal of smart plug 80 is received from master device 10 by DECT wireless I/F unit 848, control unit 847 outputs a switching signal for electrical connection between plug terminals 851 and socket terminals 852, to switch unit 854. Consequently, plug terminals 851 are electrically connected to socket terminals 852. On the other hand, in a case where an operation stop mode instruction signal of smart plug 80 is received from master device 10 by DECT wireless I/F unit 848, control unit 847 outputs a switching signal for electrical disconnection between plug terminals 851 and socket terminals 852, to switch unit 854. Consequently, plug terminals 851 are electrically disconnected from socket terminals 852.

By referring to the schedule setting information stored in storage unit 842, control unit 847 outputs a switching signal for electrical connection between plug terminals 851 and socket terminals 852 to switch unit 854 at the time (for example, refer to FIG. 9) of an operation mode included in the schedule setting information. Consequently, plug terminals 851 are electrically connected to socket terminals 852. As long as an operation stop mode instruction signal transmitted from master device 10 is not received by DECT wireless I/F unit 848 during the operation mode time, the electrical connection state between plug terminals 851 and socket terminals 852 is maintained.

On the other hand, by referring to the schedule setting information stored in storage unit 842, control unit 847 outputs a switching signal for electrical disconnection between plug terminals 851 and socket terminals 852 to switch unit 854 at the time (for example, refer to FIG. 9) of an operation stop mode included in the schedule setting information. Consequently, plug terminals 851 are electrically disconnected from socket terminals 852. As long as an operation mode instruction signal transmitted from master device 10 is not received by DECT wireless I/F unit 848 during the operation stop mode time, the electrical disconnection state between plug terminals 851 and socket terminals 852 is maintained.

Next, with reference to FIG. 8, a description will be made of an operation procedure of control of ON and OFF of smart plug 80 in house monitoring system 5 of the present embodiment. FIG. 8 is a flowchart illustrating an example of an operation procedure of controlling ON and OFF of smart plug 80 in house monitoring system 5 of the present embodiment.

In FIG. 8, master device 10 establishes DECT wireless communication with smart plug 80, and determines the present setting state of ON (operation mode) and OFF (operation stop mode) of current smart plug 80 by transmitting and receiving a predetermined signal to and from smart plug 80 (step S11).

If smart plug 80 is in an operation mode (ON in step S11), master device 10 determines that smartphone 50 is located within a wireless communication range of master device 10. The case where smartphone 50 is located within the wireless communication range indicates, for example, a case where smartphone 50 is located within the wireless communication range (that is, within a communication range of wireless router 60) of master device 10, such as the user staying in house 8. Here, if smartphone 50 is moved to a position deviated from the wireless communication range of master device 10 (YES in step S12), master device 10 recognizes that smartphone 50 has been moved to the outside of the wireless communication range of master device 10 (for example, that the user goes out from house 8 and is away from the house by a predetermined distance or more), and transmits a switching signal for causing smart plug 80 to transition to an operation stop mode (OFF) (step S13).

Consequently, switch unit 850 of smart plug 80 is switched to a non-conductive state in response to the switching signal from master device 10, and thus smart plug 80 causes electrical disconnection to occur between plug terminals 851 and socket terminals 852. In other words, smart plug 80 stops the supply of power to an electric apparatus (for example, an air conditioner, lighting equipment, camera 30, and sensor 40) connected to socket terminals 852 side of smart plug 80 (turning-off of the power source in step S14).

On the other hand, if smartphone 50 is not moved to a position deviated from the wireless communication range of master device 10 (NO in step S12), master device 10 transmits a signal for causing smart plug 80 to be continuously performed in an operation mode (ON). In this case, the operation of house monitoring system 5 returns to step S11.

If smart plug 80 is in an operation stop mode (OFF in step S11), master device 10 determines that smartphone 50 is not located within the wireless communication range of master device 10. The case where smartphone 50 is not located within the wireless communication range of master device 10 indicates, for example, a case where smartphone 50 is located out of the wireless communication range (that is, out of a communication range of wireless router 60) of master device 10, such as the user being located at a position far from house 8 by a predetermined distance or more (on an outing). Here, if smartphone 50 is moved from the outside of the wireless communication range of master device 10 to the inside of the wireless communication range (YES in step S15), master device 10 recognizes that smartphone 50 has been moved to the inside of the wireless communication range of master device 10 (for example, that the user goes out from house 8 and then returns to house 8), and transmits a switching signal for causing smart plug 80 to transition to an operation mode (ON) (step S16).

Consequently, switch unit 850 of smart plug 80 is switched to a conductive state in response to the switching signal from master device 10, and thus smart plug 80 causes electrical connection to occur between plug terminals 851 and socket terminals 852. In other words, smart plug 80 stars the supply of power to an electric apparatus (for example, an air conditioner, lighting equipment, camera 30, and sensor 40) connected to socket terminals 852 side of smart plug 80 (turning-on of the power source in step S17).

On the other hand, if smartphone 50 is not moved to a position inside the wireless communication range from the outside of the wireless communication range of master device 10 (NO in step S15), master device 10 transmits a signal for causing smart plug 80 to be continuously performed in an operation stop mode (OFF). In this case, the operation of house monitoring system 5 returns to step S11.

In FIG. 8, in steps S13 and S14, in a case where smartphone 50 is moved from the inside of the wireless communication range of master device 10 to the outside of the wireless communication range, master device 10 performs control so that smart plug 80 transitions to an operation stop mode, but, conversely, master device 10 may perform control so that smart plug 80 transitions to an operation mode.

Similarly, in FIG. 8, in steps S16 and S17, in a case where smartphone 50 is moved from the outside of the wireless communication range of master device 10 to the inside of the wireless communication range, master device 10 performs control so that smart plug 80 transitions to an operation mode, but, conversely, master device 10 may perform control so that smart plug 80 transitions to an operation stop mode.

There is a case where smartphone setup schedule setting information in which time of an operation mode (ON) or an operation stop mode (OFF) is specified is set in smart plug 80 in advance (refer to FIG. 9). FIG. 9 is a diagram illustrating an example of a state in which an ON/OFF schedule setting screen of smart plug 80 is displayed on smartphone 50 in house monitoring system 5 of the present embodiment.

For example, in smart plug 80, on weekdays from Monday to Friday, an operation mode is specified from a.m. 0 o'clock to a.m. six o'clock and from p.m. ten o'clock (twenty-two o'clock) to a.m. 0 o'clock (twenty-four o'clock), and an operation stop mode is specified from a.m. six o'clock to p.m. ten o'clock (twenty-two o'clock).

In smart plug 80, on Saturday, an operation mode is specified from a.m. 0 o'clock to a.m. eight o'clock and from p.m. two o'clock (fourteen o'clock) to a.m. 0 o'clock (twenty-four o'clock), and an operation stop mode is specified from a.m. eight o'clock to p.m. two o'clock (fourteen o'clock). In smart plug 80, on Sunday, an operation stop mode is specified all day long.

In this case, master device 10 may compare the schedule setting information displayed on the schedule setting screen illustrated in FIG. 9 with the present time, for example, so that it is determined that smart plug 80 is switched to an operation mode, and may transmit a switching signal for switching smart plug 80 to the operation mode to smart plug 80 in a case where timing for switching to the operation mode is within the operation mode time of smart plug 80. Also in a case where the present time is within the operation stop mode time of smart plug 80, smart plug 80 may prioritize a switching signal transmitted from master device 10 so as to be switched to an operation mode. In other words, smart plug 80 may prioritize a switching signal from master device 10 to schedule setting information thereof.

Similarly, master device 10 may compare the schedule setting information displayed on the schedule setting screen illustrated in FIG. 9 with the present time, for example, so that it is determined that smart plug 80 is switched to an operation stop mode, and may transmit a switching signal for switching smart plug 80 to the operation stop mode to smart plug 80 in a case where timing for switching to the operation mode is within the operation stop mode time of smart plug 80. Also in a case where the present time is within the operation mode time of smart plug 80, smart plug 80 may prioritize a switching signal transmitted from master device 10 so as to be switched to an operation stop mode. In other words, smart plug 80 may prioritize a switching signal from master device 10 to schedule setting information thereof.

The schedule setting information displayed on the schedule setting screen illustrated in FIG. 9 may be changed as appropriate through a predetermined input operation on display/operation unit 503 of smartphone 50 of a user. In a case where there is an operation error during an input operation for change, for example, if icon IC1 is tapped once, the screen returns to a previous operation input state. In a case where a changing operation of the schedule setting information has been completed, for example, if icon IC2 is tapped once, the screen returns to a predetermined home screen (not illustrated).

As mentioned above, in house monitoring system 5 of the present embodiment, master device 10 sets smart plug 80 to an operation mode in a case where smartphone 50 is located within a wireless communication range of master device 10 (in other words, in a case where a user's house is located within the wireless communication range of master device 10, the user stays in the house or the user stays at a position close to the house). On the other hand, master device 10 sets smart plug 80 to an operation stop mode in a case where smartphone 50 is not located within a wireless communication range of master device 10 (in other words, in a case where a user's house is located within the wireless communication range of master device 10, the user does not stay in the house). In a case where smart plug 80 is set to an operation mode by master device 10, power is supplied to an electric apparatus (for example, an air conditioner or lighting equipment) connected to smart plug 80, and in a case where smart plug 80 is set to an operation stop mode by master device 10, power is not supplied to the electric apparatus.

Consequently, house monitoring system 5 can switch ON and OFF of the supply of power to an electric apparatus connected to smart plug 80 in a house simply and at low cost depending on whether or not smartphone 50 is located within a wireless communication range of master device 10 as an existing fixed telephone which is connected to fixed telephone network 85 and can perform a call to another fixed telephone 800, and thus it is possible to improve user's convenience without performing a special input operation on smartphone 50. For example, when smartphone 50 carried by a user (dweller) is moved to inside a wireless communication range (wireless communication area) of master device 10, smart plug 80 enters an ON state (is turned on). Therefore, since the dweller is not required to intentionally turn on a lamp or the like when returning home, it is possible to provide a system convenient to use. Particularly, in a case where an intruder or the like stays in a residential area, since a lamp or the like is suddenly turned on, a dweller is warned of the intruder or the like, and thus this can contribute to home security.

In house monitoring system 5 of the present embodiment, smartphone 50 requests master device 10 to check schedule settings of an operation mode and an operation stop mode of smart plug 80 in response to a user's predetermined operation (first operation) on display/operation unit 503. Master device 10 stores, in storage unit 103, information regarding an operation mode and an operation stop mode of smart plug 80, and generates a schedule setting screen by using the information regarding an operation mode and an operation stop mode of smart plug 80 in response to the request for checking schedule settings from smartphone 50, and transmits the schedule setting screen to smartphone 50. Smartphone 50 displays the schedule setting screen transmitted from master device 10 on display/operation unit 503.

Consequently, since house monitoring system 5 enables a user to easily view and check a schedule setting screen of the present operation mode and operation stop mode of smart plug 80 on display/operation unit 503 of smartphone 50 through a user's simple input operation, it is possible to improve user's convenience of home monitoring.

In house monitoring system 5 of the present embodiment, smartphone 50 transmits information regarding the changed operation mode time and operation stop mode time of smart plug 80 to master device 10 in response to an operation of changing the operation mode time and the operation stop mode time of smart plug 80 on a schedule setting screen displayed on display/operation unit 503. Master device 10 updates information regarding an operation mode and an operation stop mode of smart plug 80 stored in storage unit 103 on the basis of the information regarding the changed operation mode time and operation stop mode time of smart plug 80 transmitted from smartphone 50.

Consequently, since house monitoring system 5 can easily change a schedule of an operation mode and an operation stop mode of smart plug 80 through a user's simple input operation, it is possible to arbitrarily set ON/OFF time of an electric apparatus connected to smart plug 80 in accordance with user's preference and thus to improve user's convenience of life in a house.

Although the various embodiments have been described with reference to the drawings, needless to say, the present invention is not limited to such embodiments. It is obvious that a person skilled in the art can conceive of various modifications or alterations within the scope recited in the claims, and thus it is understood that they naturally fall within the technical scope of the present invention.

What is claimed is:

1. A home monitoring system comprising:
a power supply device connectable via a plug terminal to a home electronic device to supply power to the electronic device, the power supply device including a DECT (Digital Enhanced Cordless Telecommunications) compliant communicator; and
a DECT master device that, in operation, performs wireless communication with the power supply device according to a DECT communications protocol, performs wireless communication with one or more DECT cordless handsets according to the DECT communications protocol, and is connected to a fixed telephone network to communicate with other fixed telephones,
wherein the power supply device stores operation schedule information of the power supply device and switches its operation according to the operation schedule information,
the DECT master device, when a smartphone that is communicably connectable via a wireless router with the DECT master device moves inside a wireless communication range of the wireless router, transmits a first switch signal to the power supply device, according to the DECT communications protocol, to operate the power supply device, wherein the smartphone is connectable to a mobile phone network to communicate with other mobile telephones, and
the power supply device supplies power to the electronic device by giving a higher priority to the first switch signal received from the DECT master device than the operation schedule information stored in the power supply device.

2. The home monitoring system of claim 1, wherein
the DECT master device, when the smartphone moves outside the wireless communication range of the wireless router, transmits a second switch signal to the power supply device, according to the DECT communications protocol, to stop operation of the power supply device, and
the power supply device stops supply of power to the electronic device by giving a higher priority to the second switch signal received from the DECT master device than the operation schedule information stored in the power supply device.

3. The home monitoring system of claim 2, wherein the power supply device switches its operation ON or OFF according to the operation schedule information, and the second switch signal from the DECT master device turns OFF the power supply device regardless of the operation schedule information.

4. The home monitoring system of claim 1, wherein the power supply device switches its operation ON or OFF according to the operation schedule information, and the first switch signal from the DECT master device turns ON the power supply device regardless of the operation schedule information.

5. The home monitoring system of claim 1, wherein the operation schedule information is changeable by a user operation on the smartphone.

6. A monitoring method based on a home monitoring system, the home monitoring system comprising: (a) a power supply device connectable via a plug terminal to a home electronic device to supply power to the electronic device, the power supply device including a DECT (Digital Enhanced Cordless Telecommunications) compliant communicator; and (b) a DECT master device that, in operation, performs wireless communication with the power supply device according to a DECT communications protocol, performs wireless communication with one or more DECT cordless handsets according to the DECT communications protocol, and is connected to a fixed telephone network to communicate with other fixed telephones, the monitoring method comprising:
storing, in the power supply device, operation schedule information of the power supply device,
switching operation of the power supply device according to the operation schedule information,
detecting, at the DECT master device, that a smartphone that is communicably connectable via a wireless router with the DECT master device has moved inside a wireless communication range of the wireless router, wherein the smartphone is connectable to a mobile phone network to communicate with other mobile telephones,
transmitting, from the DECT master device that has detected that the smartphone has moved inside the wireless communication range to the power supply device, a first switch signal according to the DECT communications protocol,
operating the power supply device to supply power to the electronic device based on the first switch signal by giving a higher priority to the first switch signal from the DECT master device than the operation schedule information stored in the power supply device.

7. The monitoring method of claim 6, further comprising:
detecting, at the DECT master device, that the smartphone has moved outside the wireless communication range of the wireless router,
transmitting, from the DECT master device that has detected that the smartphone has moved outside the wireless communication range to the power supply device, a second switch signal according to the DECT communications protocol, and
stopping operation of the power supply device to stop supply of power to the electronic device based on the second switch signal by giving a higher priority to the second switch signal from the DECT master device than the operation schedule information stored in the power supply device.

8. The monitoring method of claim 7, further comprising:
switching operation of the power supply device ON or OFF according to the operation schedule information, and
turning OFF the power supply device based on the second switch signal from the DECT master device regardless of the operation schedule information stored in the power supply device.

9. The monitoring method of claim 6, further comprising:
switching operation of the power supply device ON or OFF according to the operation schedule information, and
turning ON the power supply device based on the first switch signal from the DECT master device regardless of the operation schedule information stored in the power supply device.

10. The monitoring method of claim 6, further comprising:
changing the operation schedule information according to a user operation on the smartphone.

* * * * *